United States Patent
Tazoe et al.

(10) Patent No.: US 8,225,278 B2
(45) Date of Patent: Jul. 17, 2012

(54) METHOD OF VISUALIZING MODIFICATIONS OF A HIERARCHICAL STATE DIAGRAM

(75) Inventors: Eiichi Tazoe, Tokyo (JP); Tsuyoshi Matsuzaki, Tokyo (JP); Munetaka Ohtani, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 1464 days.

(21) Appl. No.: 11/747,940

(22) Filed: May 14, 2007

(65) Prior Publication Data

US 2008/0288916 A1 Nov. 20, 2008

(51) Int. Cl.
*G06F 9/44* (2006.01)
(52) U.S. Cl. ......... 717/109; 717/105; 717/106; 717/120
(58) Field of Classification Search .................... 717/105
See application file for complete search history.

(56) References Cited

U.S. PATENT DOCUMENTS

| | | | | |
|---|---|---|---|---|
| 7,694,273 B2* | 4/2010 | Kodosky et al. | ............. | 717/113 |
| 7,818,715 B2* | 10/2010 | Kodosky et al. | ............. | 717/109 |
| 7,818,716 B2* | 10/2010 | Kodosky et al. | ............. | 717/109 |
| 7,882,490 B2* | 2/2011 | Kodosky et al. | ............. | 717/109 |
| 7,882,491 B2* | 2/2011 | Kodosky et al. | ............. | 717/109 |
| 7,913,227 B2* | 3/2011 | Aikens et al. | ............. | 717/120 |
| 2006/0041579 A1* | 2/2006 | Miyashita et al. | ............. | 707/102 |
| 2006/0080626 A1* | 4/2006 | Ohba et al. | ............. | 716/6 |
| 2007/0113156 A1* | 5/2007 | Watanabe et al. | ............. | 714/766 |
| 2007/0168943 A1* | 7/2007 | Marini et al. | ............. | 717/108 |
| 2008/0288916 A1* | 11/2008 | Tazoe et al. | ............. | 717/105 |
| 2009/0013307 A1* | 1/2009 | Raghavan et al. | ............. | 717/106 |

FOREIGN PATENT DOCUMENTS

JP 05-127882 5/1993

OTHER PUBLICATIONS

Chawathe et al., Change Detection in Hierarchically Structured Information, Department of Computer Science, Stanford University, Stanford, California, Published 1995.*
Das et al., Model checking on state transition diagram, Jan. 2004, 6 pages, <http://delivery.acm.org/10.1145/1020000/1015194/p412-das.pdf>.*
A. Kvamme, Usability achievements based on UI framework with screen categories and state transition diagrams, Oct. 2006, 2 pages, <http://delivery.acm.org/10.1145/1190000/1182542/p481-kvamme.pdf>.*
J. Dong, State, event, time and diagram in system modeling, Jul. 2001, 2 pages, <http://delivery.acm.org/10.1145/390000/381617/p733-dong.pdf>.*

* cited by examiner

*Primary Examiner* — Thuy Dao
(74) *Attorney, Agent, or Firm* — Lieberman & Brandsdorfer, LLC

(57) ABSTRACT

Hierarchical state diagrams are reflected in a tree structure with the initial state of the diagram represented as the parent node, intermediate states represented as intermediate levels of the hierarchy, and final states represented as the lowest level in the hierarchy. Information on the modification(s) on a child or subsequent level is transferred to the parent node. Such information includes quantifying and displaying of the modification(s). Accordingly, content and extent of any modifications to the diagram can be viewed at the parent node without requiring review of different levels in the hierarchy to view modifications to the state and/or transition in such levels.

17 Claims, 10 Drawing Sheets

METHOD OF VISUALIZING MODIFICATIONS OF A HIERARCHICAL STATE DIAGRAM

BACKGROUND OF THE INVENTION

1. Technical Field

This invention relates to a hierarchical representation of a state diagram. More specifically, the invention relates to graphically presenting modifications to the hierarchical state diagram in a manner that transfers across the hierarchical layers therein.

2. Description of the Prior Art

State diagrams are used to graphically represent finite state machines. One form of a state diagram for a finite state machine is a directed graph. Another form of the state diagram is represented through the unified modeling language (UML), i.e. a modeling language in which the state diagram includes standardized notation that can describe computer programs, business processes, etc. Basic notational elements that make up a diagram include the following: a filled circle pointing to the initial state, a hollow circle containing a smaller filled circle indicating the final state, a rounded rectangle denoting a state, an arrow denoting transition, and one or more horizontal lines denoting a join or a fork. UML state machine diagrams depict the various states that an object may be in and the transitions between those states. In the state diagram, a state represents a stage in the behavior of an object, including an initial state, a final state, and possibly transition states. An initial state, also known as a creation state, is one that an object is in when it is first created. In contrast, a final state is one in which no transactions lead out of. A transition state is a state between the initial state and the final state, and is a state that represents a progression from one state to another. The transition state is triggered by an event that is either internal or external to the object. Accordingly, the state diagram models objects that exhibits both behavior and state.

In a conventional state diagram, all states are represented at the same level. The design does not capture the commonality that exists among states. A hierarchical state machine diagram captures the commonality by organizing the states as a hierarchy. The states at the higher level in the hierarchy perform common message handling, while the lower level states inherit the commonality from the higher level states and perform state specific functions.

State diagrams are stored according to internal data transcription. It is known in the art that state diagrams may be modified over time. However, because the diagram is stored according to internal data transcription, it is difficult to understand the difference between a second version diagram and the original diagram. The difficulties understanding modification of the models increases with complexity with respect to the hierarchical state diagram wherein the differences may need to be expressed at different levels in the hierarchy.

Therefore there is a need to facilitate presentation and viewing of modifications of a hierarchical state diagram. The review process should be limited to a specific level in the hierarchy in order to mitigate the complexity of the comparison process across the levels of the hierarchy.

SUMMARY OF THE INVENTION

This invention comprises a method, system, and article for comparing hierarchical state diagrams and graphical representing modifications to the diagram.

In one aspect of the invention, a method is provided for visualizing a state transition hierarchical diagram. The diagram is expressed in a tree structure, with each level in the hierarchy having a state represented as a node, and a transition represented as a line between two nodes. A node of a modified version of the diagram is compared with a corresponding node of an earlier version of the diagram. All modifications to the compared nodes of the diagrams are counted. Similarly, a transition of the modified version of the diagram is compared with a corresponding transition of the earlier version of the diagram. All modifications to the compared transitions of the diagrams are counted, quantified, and presented on a visual display.

In another aspect of the invention, a computer system is provided with a processor in communication with storage media and a visual display. A hierarchical state diagram is stored in computer readable format in the storage media and represents behavior of an object. The diagram has at least two states at different hierarchical levels and at least one transition between the states. A director is provided to express the diagram in a tree structure with a parent level and at least one child level, with each level in the hierarchy having a state represented as a node and a transition represented as a line between two nodes. A node comparison manager is provided to compare a node of a modified state diagram with a corresponding node of an earlier version of the diagram. The node comparison manager counts all modifications to the compared nodes of the diagrams and reports the node count to the director. A transition comparison manager compares a transition of a modified state diagram with a corresponding transition of an earlier version of the diagram. The transition manager counts all modifications to the compared transitions of the diagram and reports the transition count to the director. Finally, the director quantifies the node and transition modifications, and forwards them to a visual display to illustrate the quantified modifications.

In yet another aspect of the invention, an article is provided with a computer readable medium having computer-readable instructions stored thereon executable by a processor. Instructions are provided in the medium to express a hierarchical state diagram in a tree structure with a parent level and at least one child level, with each level in the hierarchy having a state represented as a node and a transition represented as a line between two nodes. In addition, instructions are provided to compare a node of a modified version of the diagram with a corresponding node of an earlier version of the diagram, together with instructions to count all modifications to the compared nodes of the diagram. Similarly, instructions are provided to compare a transition of the modified version of the diagram with a corresponding transition of an earlier version of the diagram, together with instructions to count all modifications to the compared transitions of the diagram. Finally, instructions are provided to quantify the counted modifications and to display the quantified modifications.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

State diagrams have basic elements that include a rounded box representing the state of the object and arrows indicating the transition to the next state. An activity section of a state depicts what activities the object will be doing while it is in that state. All state diagrams begin with an initial state of the object. This is the state of the object when it is created. After the initial state, the object begins changing states. A hierarchical state diagram is represented in a tree structure with a parent level and one or more child levels. In a hierarchical state diagrams, the initial state is the parent node of a tree structure and the child nodes represent secondary states, i.e. a transition state or a final state. Conditions based on activities determine the next state to be represented in the diagram, i.e. the state the object transitions to. It is accepted in the art that a modeled state diagram may be modified over time. The modifications are accumulated at each layer of the hierarchical representation of the diagram. Each modification is then reflected in a visual manner to facilitate recognition of modifications in the hierarchical representation.

Technical Details

Figure 1:
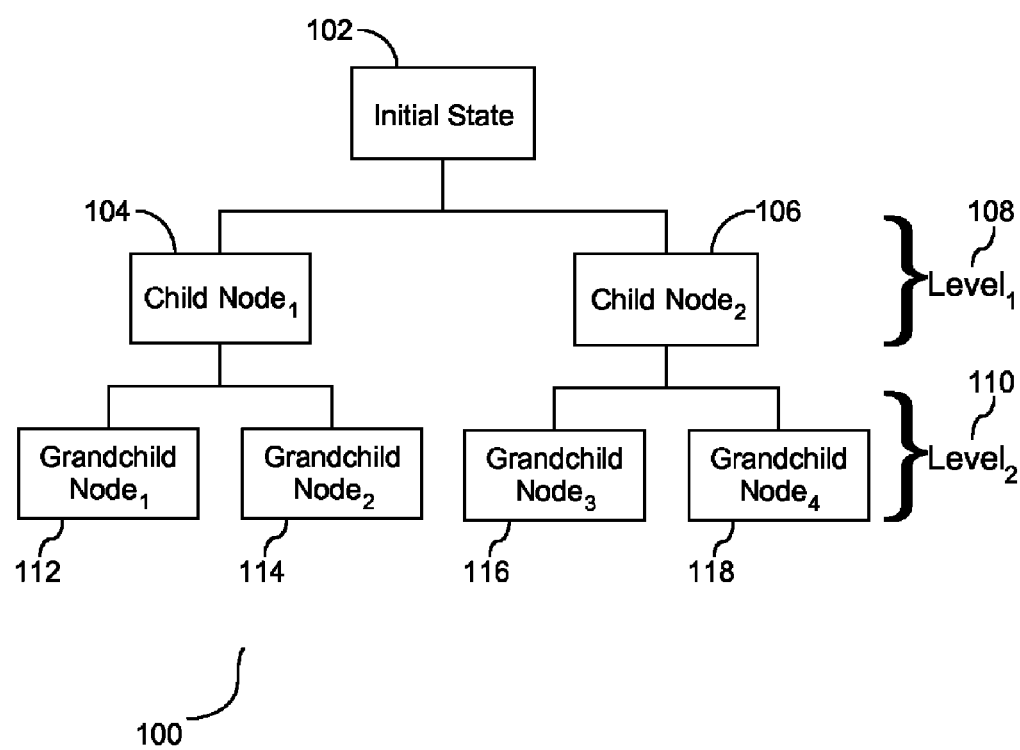
FIG. 1 is a prior art block diagram of a hierarchical state diagram in a tree structure.

FIG. 1 is a prior art block diagram (100) of a hierarchical state diagram in a tree structure. As shown, the initial state is represented as the parent node (102). There are two child nodes (104) and (106) that emanate from the parent node (102). Both of the child nodes (104) and (106) are at the same generation level (108) in the tree structure. This is an indication that the transition from the parent node (102) proceeds to one of two activities as represented as a fork to either node (104) or node (106). The tree structure shown herein has a second generation child level (110) with four nodes represented therein, (112), (114), (116), and (118). Accordingly, each of the child nodes (104) and (106) reflect a transition state from the initial state in the diagram.

With respect to the second generation child level (110), two of the nodes represent transitions from each of the nodes (104) and (106) in the first generation level (108). More specifically, a transition from child node (104) proceeds to one of two states as represented by a fork to either node (112) or node (114). Similarly, a transition from child node (106) proceeds to one of two states as represented by a fork to either node (116) or node (118). Each of the nodes (112), (114), (116), and (118) represent a final state in the diagram as there is no subsequent generation depicted in the hierarchical representation beyond each of these nodes.

It is known in the art that a state transition diagram may be modified over the course of time. Modifications may be made to states, transitions, or both. In a hierarchical state diagram, the modifications may occur on different generation levels of the diagram. The modifications may be applied to the state of the object or to the transition of the object. To facilitate review of modifications to states and transitions in one or more levels of the hierarchical tree structure, the modifications are transferred to the parent node at the top of the hierarchy.

Figure 2:
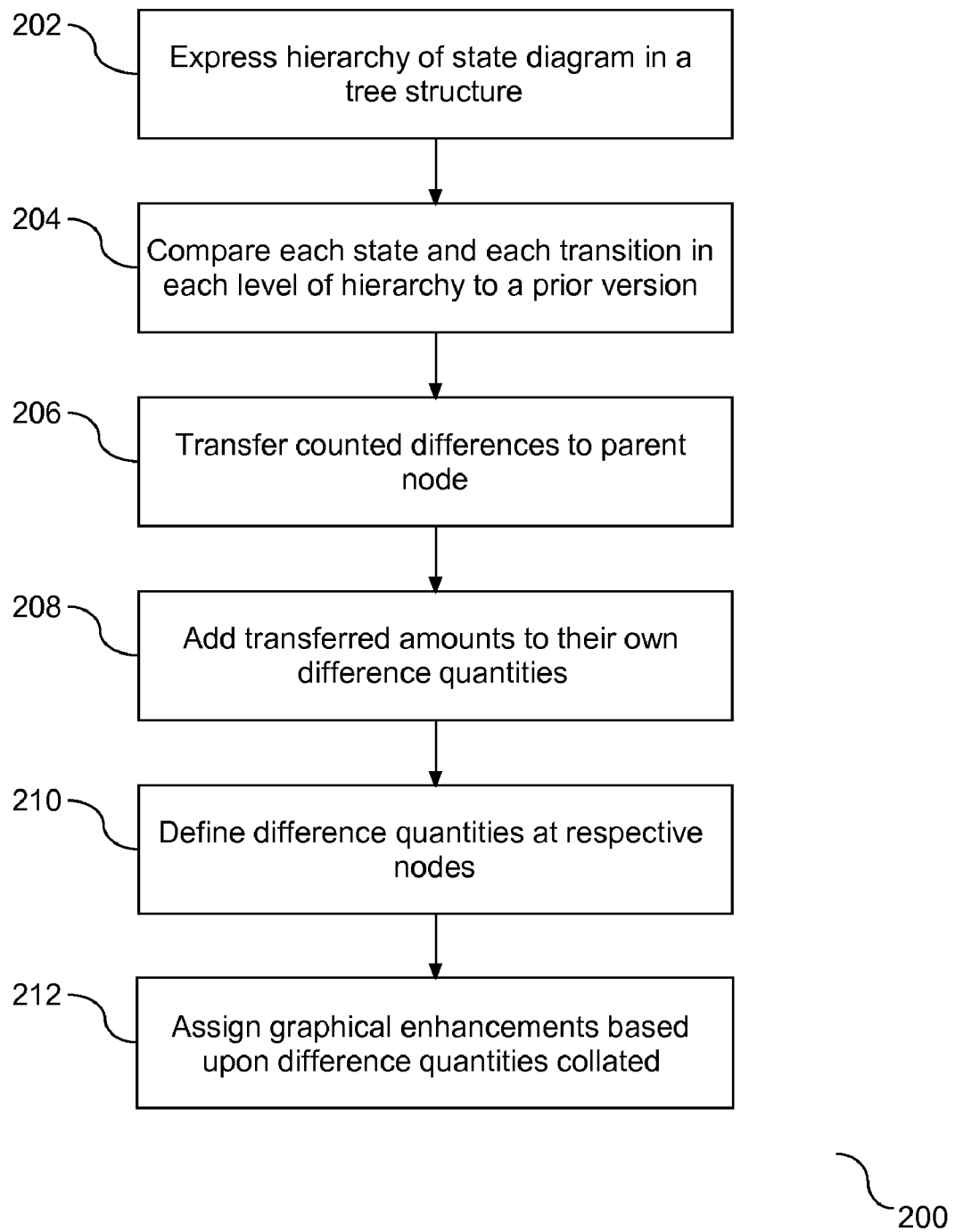
FIG. 2 is a flow chart illustrating a process for detecting modifications in the hierarchical state diagram, according to the preferred embodiment of this invention, and is suggested for printing on the first page of the issued patent.
Figure 4:
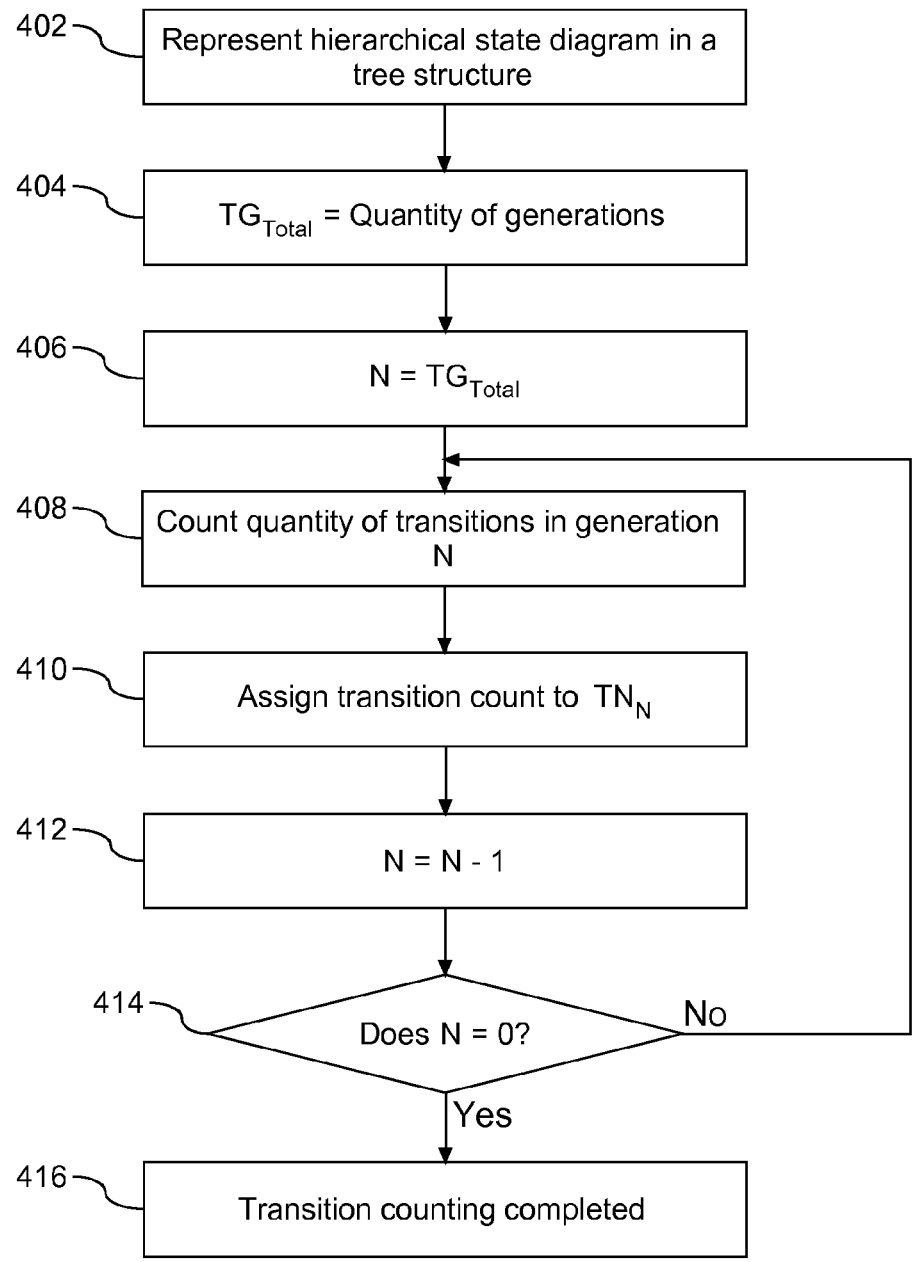
FIG. 4 is a flow chart illustrating a process for counting the quantity of transitions in the hierarchical state diagram.
Figure 5A:
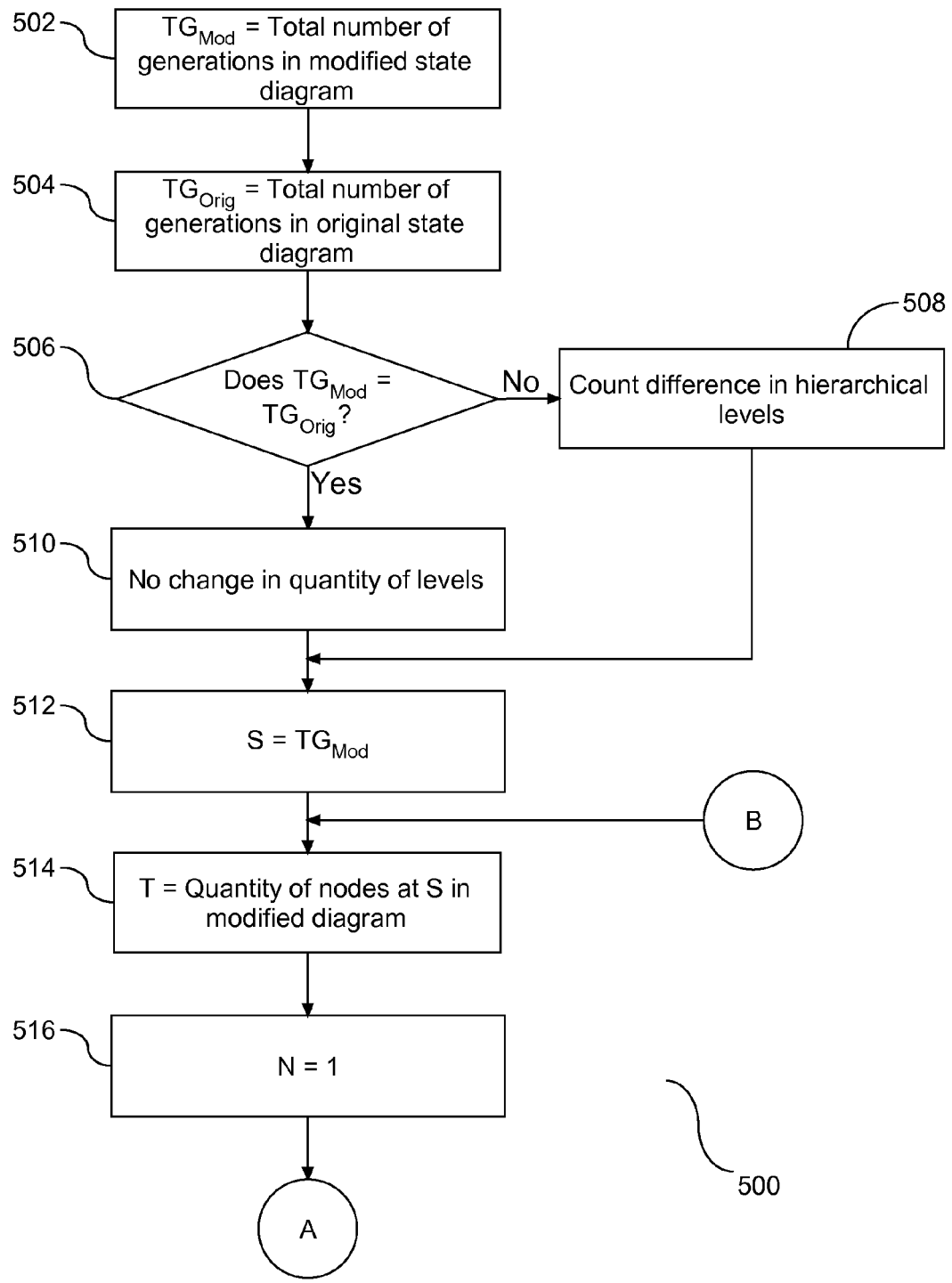
FIGS. 5A and 5B are flow charts illustrating a process for counting modifications made to the state(s) of a state diagram.
Figure 5B:
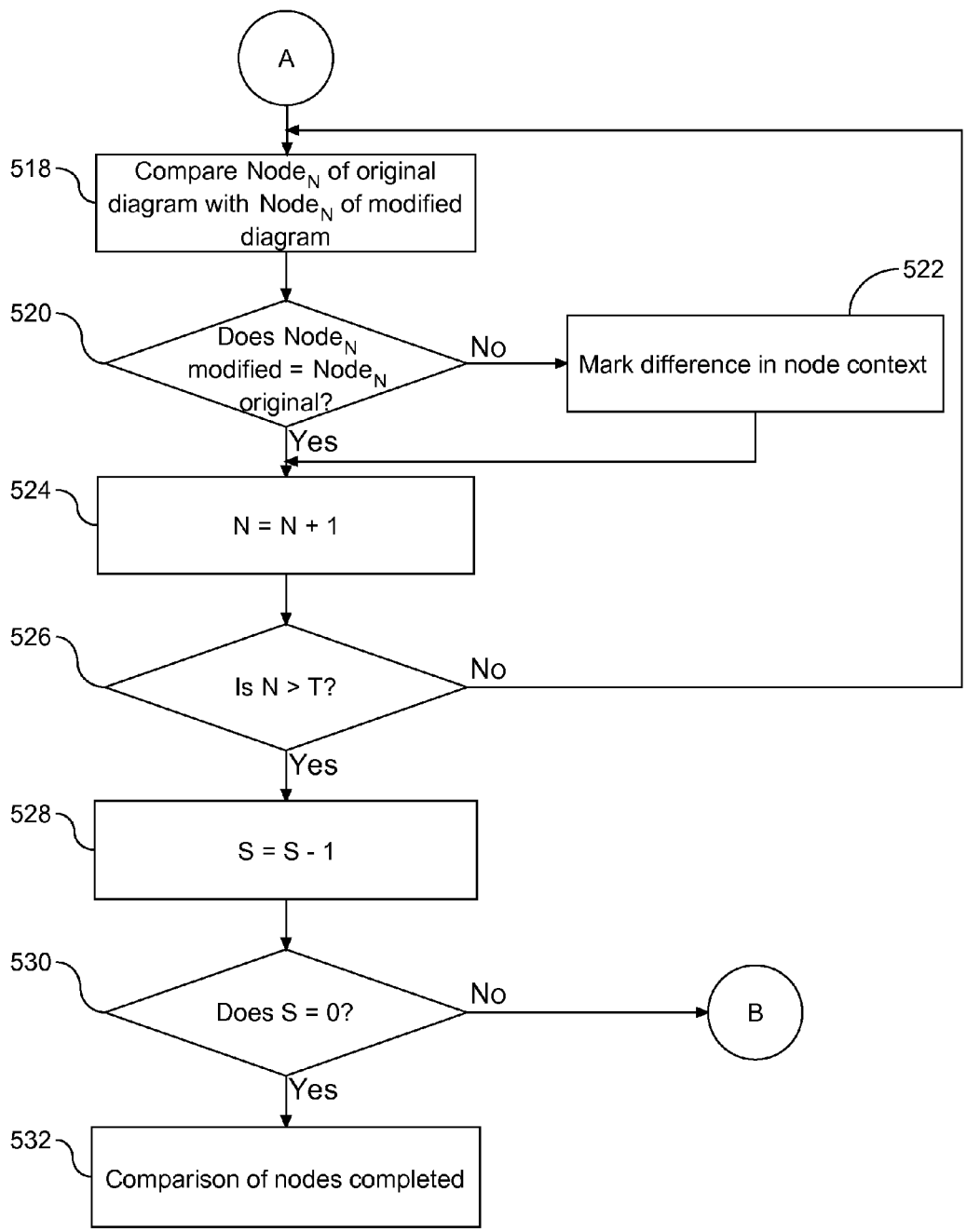

FIG. 2 is a flow chart (200) illustrating the process of detecting modifications in a hierarchical state diagram, collating these modifications, and reflecting them in the parent node of the tree structure. Initially, a tree structure (202) is used to illustrate the modifications made to the hierarchical state diagram being considered for review. Each state in the diagram is represented as a node, and each transition in the diagram is represented as a line connecting two states. A detailed illustration of a hierarchical state diagram in a tree structure is described and shown above in FIG. 1. Following step (202), each state and each transition in each level of the hierarchy is separately compared to a prior or original version of each state and each transition of the prior or original state diagram (204). FIGS. 4, 5A, and 5B illustrate a detailed description of the comparison process. During the comparison process, each modification is noted and stored. In one embodiment, a counter is established to count the modifications made to each state and each transition. Similarly, in one embodiment, the counter is reset to independently count the modifications made to the separate states and transitions in the diagram. Following completion of the comparison process, the counted differences are transferred to the parent node, i.e. initial state (206). At the parent node, the transferred amounts are added to their own difference quantities (208). More specifically, the counted differences are transferred to the parent node. The following is an example of step (208). A state A has three children states, B1, B2, and B3. The changes to the parent node state A, diff(A), is the sum of the changes to the children states B1, B2, and B3 together with the amount of modifications in each transition, diff(arc). The following is a mathematical representation of the changes to reflected in the parent node, state A:

$$Diff(A)=diff(B1)+diff(B2)+diff(B3)+diff(\text{arcs})$$

Following step (208), the difference quantities at the respective nodes (210) are defined. In one embodiment, identifying indicia in the form of graphical enhancements are utilized to illustrate the quantity of modifications to a respective state and/or transition, as well as the level in the hierarchy where the modification has occurred. This enables a view of the parent node to facilitate localization of the desired modification. In one embodiment, the graphical enhancements may include different colors, different shades of gray, or different forms of hash markings. Regardless of the format of the difference quantities, the graphical enhancement is assigned based upon the difference quantities collated (212). Accordingly, the modifications to the state diagram are determined and transferred to the parent node in a graphical format to assist in localizing the modifications made.

Figure 3:
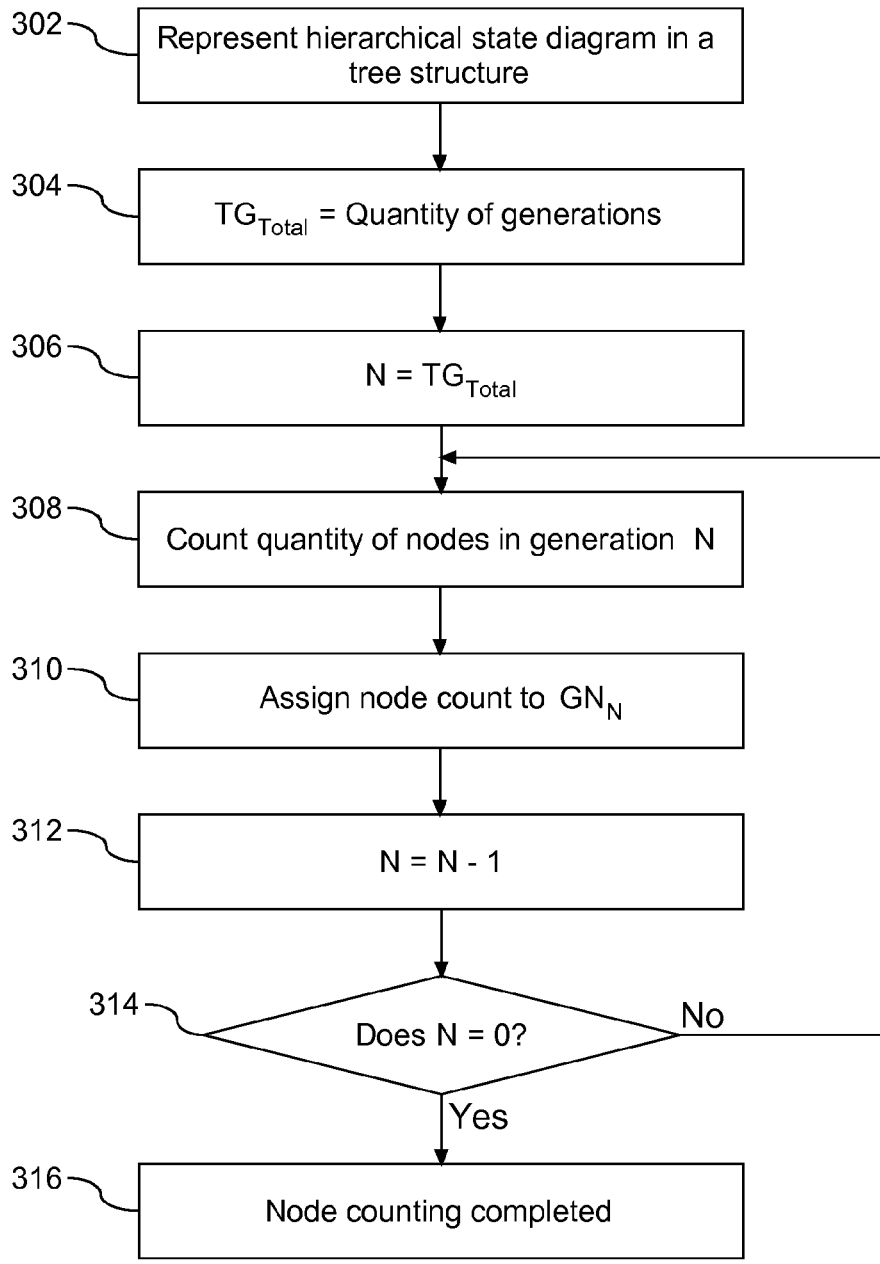
FIG. 3 is a flow chart illustrating a process for counting the quantity of nodes in the hierarchical state diagram.

FIG. 3 is a flow chart (300) illustrating a process for counting the quantity of nodes in the hierarchical state diagram in the initial part of the transition determination process. Modifications to any structure reflect modifications made from an original structure to a subsequent structure. Accordingly, the process of comparing a state hierarchical diagram requires a comparison of an originating diagram to a subsequent version of the diagram with modifications made thereto.

The hierarchical state diagram is represented in a tree structure (302) having one or more generations. The quantity of generations in the tree are counted and assigned to the variable $TG_{total}$ (304). The variable N is assigned to the integer represented by $TG_{total}$ (306). The quantity of nodes in generation N of the tree structure are counted (308) and assigned to the variable $GN_N$ (310). Following the process of counting the quantity of nodes at a specified generation (310), the variable N is decreased by a factor of one (312) and a determination is made as to whether the variable N is now set to zero (314). If the response to the determination at step (314) is positive, the process of counting nodes in the tree structure is completed (316). However, if the response to the determination at step (314) is negative, the process returns to step (308) to continue counting the quantity of nodes in the next higher generation level of the tree structure. The process of accumulating the quantity of nodes in the tree structure continues until the parent level has been counted. The process outlined in FIG. 3 is conducted separately for both the original tree structure as well as the modified tree structure with different variables utilized to identify the quantity of nodes in each generation level in the different tree structures.

As shown in FIG. 3, the quantity of nodes, i.e. states, in the hierarchical diagram are counted for each generation level of the hierarchy. A similar process is conducted for the quantity of transitions in each generation level of the hierarchy. FIG. 4 is a flow chart (400) illustrating a process for counting the quantity of transitions at each level in the hierarchy. The hierarchical state diagram is represented in a tree structure (402) having one or more generations. The quantity of generations in the tree are counted and assigned to the variable $TG_{total}$ (404). The variable N is assigned to the integer represented by $TG_{total}$ (406). The quantity of transitions in generation N of the tree structure are counted (408) and assigned to the variable $TN_N$ (410). Following the process of counting the quantity of transitions at a specified generation (410), the variable N is decreased by a factor of one (412) and a determination is made as to whether the variable N is now set to zero (414). If the response to the determination at step (414) is positive, the process of counting transitions in the tree structure is completed (416). However, if the response to the determination at step (414) is negative, the process returns to step (408) to continue counting the quantity of transitions in the next higher generation level of the tree structure. The process of accumulating the quantity of transitions in the tree structure continues until the parent level has been counted. The process outlined in FIG. 4 is conducted separately for both the original tree structure as well as the modified tree structure with different variables utilized to identify the quantity of transitions at each generation level in the different tree structures.

Following the process of counting the total quantity of states in each generation in both the modified state diagram and the original state diagram, a comparison is conducted of each state at each generation level to determine the modifications made. FIGS. 5A and 5B are flow charts (500) illustrating the process for counting the modifications made to the states, i.e. nodes, of the tree structure. As noted above, the total number of generations in the tree structure of the state diagram is separately determined for both the original and modified state diagrams. The integer $TG_{mod}$ represents the total number of generations in the tree structure of the modified state diagram (502), and the integer $TG_{orig}$ represents the total number of generations in the tree structure of the original state diagram (504). The integers $TG_{mod}$ and $TG_{orig}$ are compared to determine if they are equivalent (506). If it is determined at step (506) that these integers are not equivalent, then this difference is marked and counted to be reflected as a modification to the state diagram (508). However, if it is determined that these integers are equivalent then this is an indication that the quantity of levels in the hierarchy of the state diagram was not modified during the modification process (510). Thereafter, the variable S is set to the integer $TG_{mod}$ (512) and the variable T is set to the quantity of nodes counted at S in the modified state diagram (514). The settings at steps (512) and (514) establish the basis for comparing each of the nodes in the lowest level of the tree structure. At the initial start of the comparison, the variable N is set to the integer one (516), followed by a comparison of $Node_N$ of the original state diagram with $Node_N$ of the modified state diagram at generation level S (518). The comparison at step (518) is followed by a determination as to whether modifications were made to a specific state in the diagram by comparing the context of the modified node with the original node (520). If it is determined that there is a modification to the compared nodes, the difference is marked to be reflected as a modification to the state diagram (522). In one embodiment, the marked difference is stored in a recordable medium identifying the specific difference reflected at a specified node in the state diagram. However, if it is determined that there is no modification to the compared nodes, or after completion of the marking at step (522), the variable N is incremented (524) followed by a comparison of the incremented variable N to the quantity of nodes T at the generation level being reviewed (526). If the response to the determination at step (526) is negative, this is an indication that there are more nodes at this generation level that still need to be compared, and the process returns to step (518). However, if the response to the determination at step (526) is positive, this is an indication that there are no more nodes at this generation that remain to be compared. Following a positive response to the determination at step (526), the variable S is decreased by a factor of one (528) and a test is conducted to determine if the variable S set at step (528) has the value zero (530). If the response to the determination at step (530) is positive, the comparison of the nodes at each generation level is completed (532). However, if the response to the determination at step (530) is negative, the process returns to step (514) to initiate comparison of the nodes in the next higher level in the tree structure. Accordingly, as shown herein, each of the states of the hierarchical diagram are compared at each generation level in the hierarchy and all modifications are marked.

As noted above, each modification from the original state diagram to the modified state diagram are marked. In one embodiment, the modifications are stored as data in a recordable data storage medium in a manner that facilitates retrieval of the data. The gathered data may be used to reflect the modifications to a user in a graphical manner, a collated report, or another format that facilitates communication of the modifications to the user.

Figure 6A:
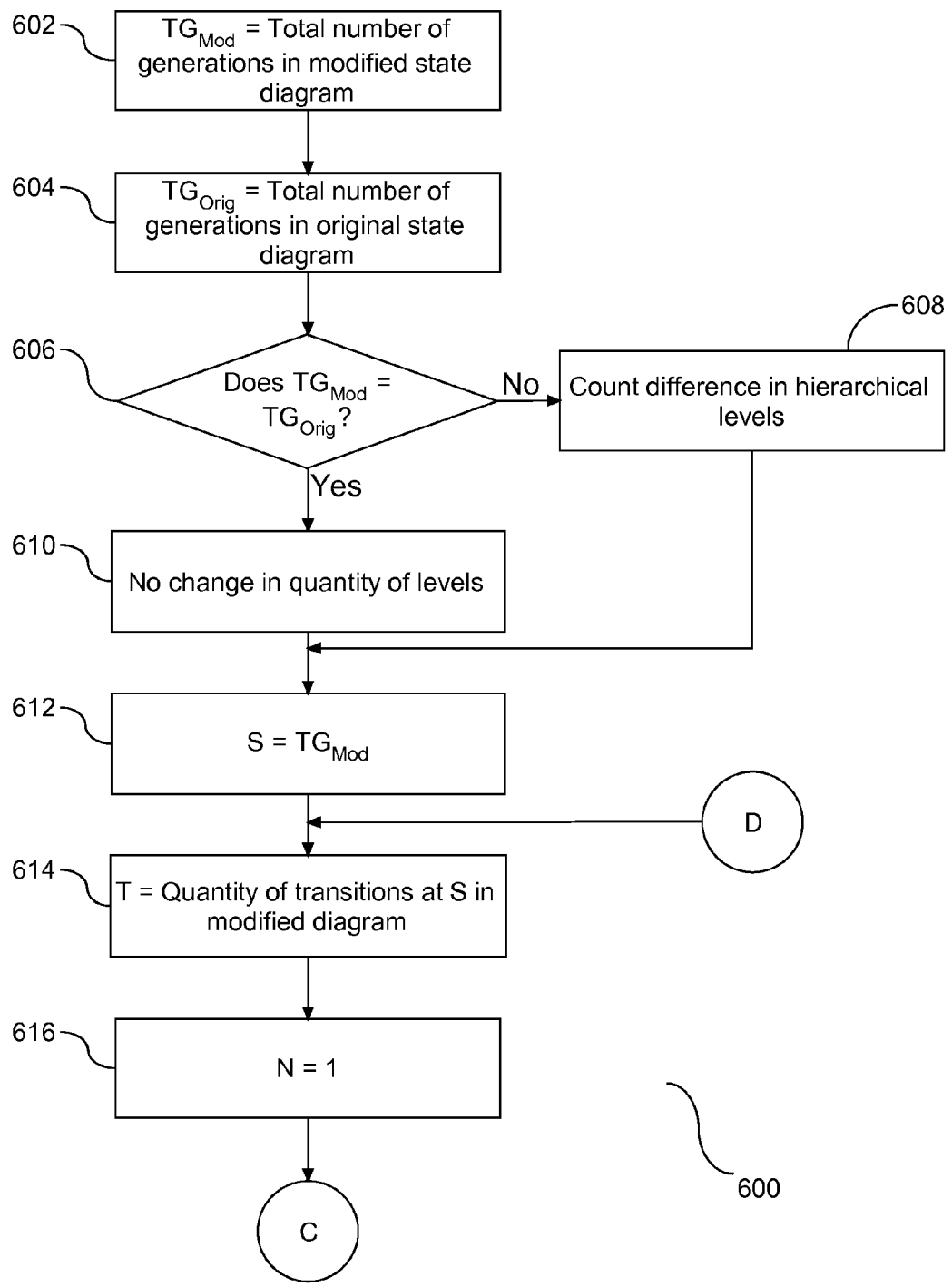
FIGS. 6A and 6B are flow charts illustrating a process for counting modifications made to the transition(s) of a state diagram.
Figure 6B:
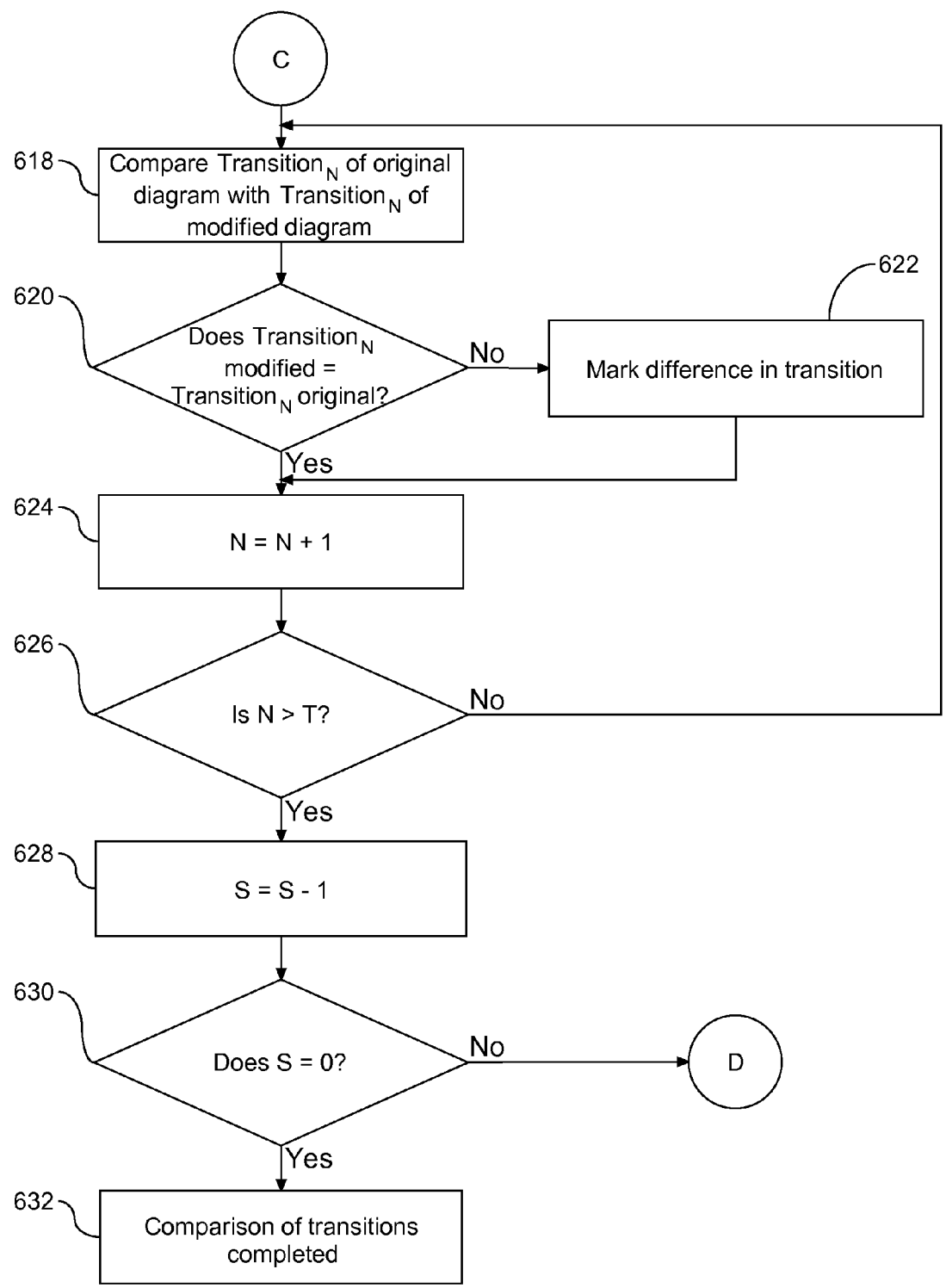

In addition to comparing the nodes, i.e. states, and any modifications made thereto in the diagram, a complete comparison of diagrams also includes a comparison of each transition in each level of the hierarchy. FIGS. 6A and 6B are flow charts (600) illustrating the process for counting the modifications made to the transitions of the hierarchical state diagram. As noted above, the total number of generations in the tree structure of the state diagram is separately determined for both the original and modified state diagrams. The integer $TG_{mod}$ represents the total number of generations in the tree structure of the modified state diagram (602), and the integer $TG_{orig}$ represents the total number of generations in the tree structure of the original state diagram (604). The integers $TG_{mod}$ and $TG_{orig}$ are compared to determine if they are equivalent (606). If it is determined at step (606) that these integers are not equivalent, then this difference is marked to be reflected as a modification to the state diagram (608). However, if it is determined that these integers are equivalent then this is an indication that the quantity of levels in the hierarchy of the state diagram was not modified during the modification process (610). Thereafter, the variable S is set to the integer $TG_{mod}$ (612) and the variable T is set to the quantity of transitions counted at S in the modified state diagram (614). The settings at steps (612) and (614) establish the basis for comparing each of the transitions in the lowest level of the tree structure. At the initial start of the comparison, the variable N is set to the integer one (616), followed by a comparison of Transition$_N$ of the original state diagram with Transition$_N$ of the modified state diagram of generation level S (618). The comparison at step (618) is followed by a determination as to whether modifications were made to a specific transition in the diagram by comparing the context of the modified transition with the original transition (620). If it is determined that there is a modification to the compared transitions, the difference is marked to be reflected as a modification to the state diagram (622). In one embodiment, the marked difference is stored in a recordable medium identifying the specific difference reflected at a specified transition in the state diagram. However, if it is determined that there is no modification to the compared transitions, the variable N is incremented (624) followed by a comparison of the incremented variable N to the quantity of transitions, T, at the generation level being reviewed (626). If the response to the determination at step (626) is negative, this is an indication that there are more transitions at this generation level that still need to be compared, and the process returns to step (618). However, if the response to the determination at step (626) is positive, this is an indication that there are no more transitions at this generation that remain to be compared. Following a positive response to the determination at step (626), the variable S is decreased by a factor of one (628) and a test is conducted to determine if the variable S set at step (626) has the value zero (630). If the response to the determination at step (630) is positive, the comparison of the transitions at each generation level is completed (632). However, if the response to the determination at step (630) is negative, the process returns to step (614) to initiate comparison of the transitions in the next higher level in the tree structure. Accordingly, as shown herein, each of the transitions of the hierarchical diagram are compared at each generation level in the hierarchy and all modifications are marked.

As noted above, the modifications made to each state and each transition in each generation of the hierarchical diagram is counted to be reflected at the parent node with indicia. The difference quantity of a state in each generation in the state diagram is expressed as follows:

$$D(s)=d(\text{self})+\text{sum}(d(\text{arc}))+\text{sum}(d(\text{sub-state}))*k$$

wherein, s is a count of the states in the diagram, d(self) is the amount of modification in an attribute of a state, d(arc) is the amount of modification in a transition, d(sub-state) is the amount of modification in a sub-state, and k is a transmission ratio. In one embodiment, a sub-state is a child state. In a hierarchical state diagram, a higher generation state or transition has a stronger influence on the structure of the hierarchy than a lower generation state or transition. More specifically, a higher generation state or transition dominates the framework of the hierarchy. The transmission ratio, k, is a factor that accounts for the location in the level of the hierarchy where the modification is reflected. In other words, the transmission ratio attenuates the large influence of a modification to a state or transition in a layer in the hierarchy at or close to the parent level in comparison to a modification to a state or transition in a layer further removed from the parent layer.

Figure 7:
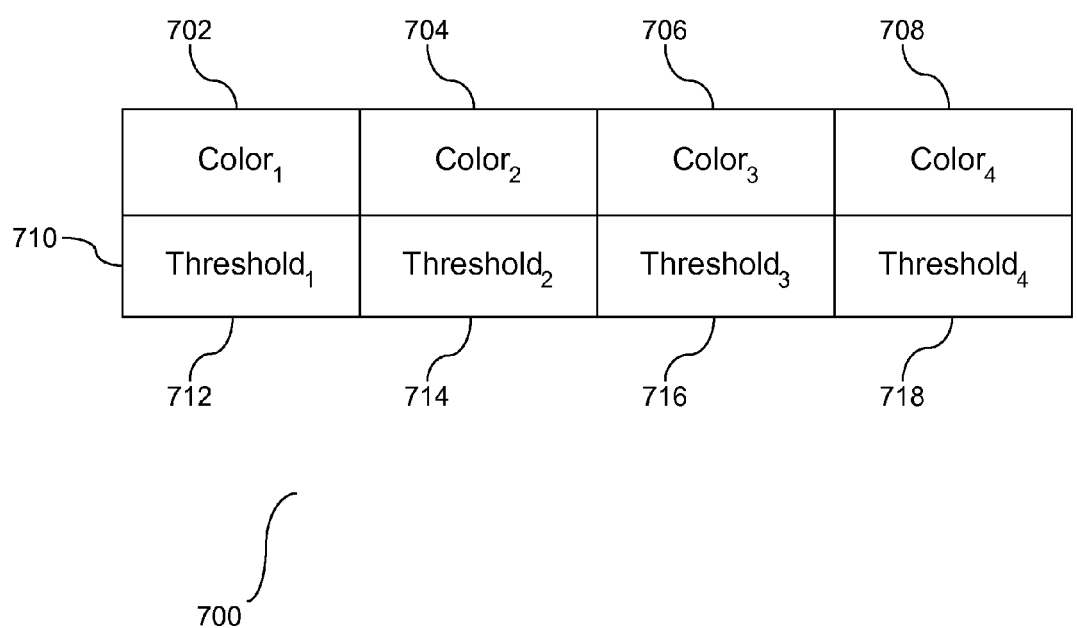
FIG. 7 is a block diagram of a sample table illustrating colors associated with quantified modifications.

As noted above, the quantity of modifications to the state diagram are quantified for each state and each transition. In one embodiment, the quantified modifications to states and/or transitions are displayed with graphical indicia, such as different colors applied to different quantities of modifications. FIG. 7 is a block diagram (700) of a sample table illustrating colors associated with quantified modifications. As shown in this example, there are four colors (702), (704), (706), and (708). The first color (702) is an indication of no modifications, the second color (704) is an indication of a small quantity of modifications, the third color (706) is an indication of a medium quantity of modifications, and the fourth color (708) is an indication of a large quantity of modifications. In one embodiment, modifications that include additional states and/or transition would include assignment of non-used colors to the sample table. In the sample table (700), the first color (702) is grey, the second color (704) is green, the third color (706) is yellow, and the fourth color (708) is red. In one embodiment, the colors may be modified and the assignment provided herein should not be limited. Similarly, the difference levels can be caused to correspond to the difference quantities by setting thresholds for the respective levels. FIG. 7 includes a row (710) associating a threshold with each of the modification levels. For example, in one embodiment, a threshold of zero (712) may be applied to no modifications (702), a threshold of one (714) may be applied to a small quantity of modifications (704), a threshold of two to five modifications (716) may be applied to a medium quantity of modifications (706), and a threshold of greater than five modifications (718) may be applied to a large quantity of modifications. The color modifications may be applied to a graphical representation of the state diagram. This enables a graphical review of the diagram with colors applied thereto to reflect the modifications made to the state(s) and/or transition(s). This alleviates the requirement of a review of the computer program code associated with diagram, which may be complex. Accordingly, application of color enhancements to the state diagram illustrates the modifications to the diagram in a graphical manner.

In one embodiment, the invention is implemented in software, which includes but is not limited to firmware, resident software, microcode, etc. The invention can take the form of a computer software product accessible from a computer-usable or computer-readable medium providing program code for use by or in connection with a computer or any instruction execution system. For the purposes of this description, a computer-usable or computer-readable medium can be any apparatus that can contain, and store the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Figure 8:
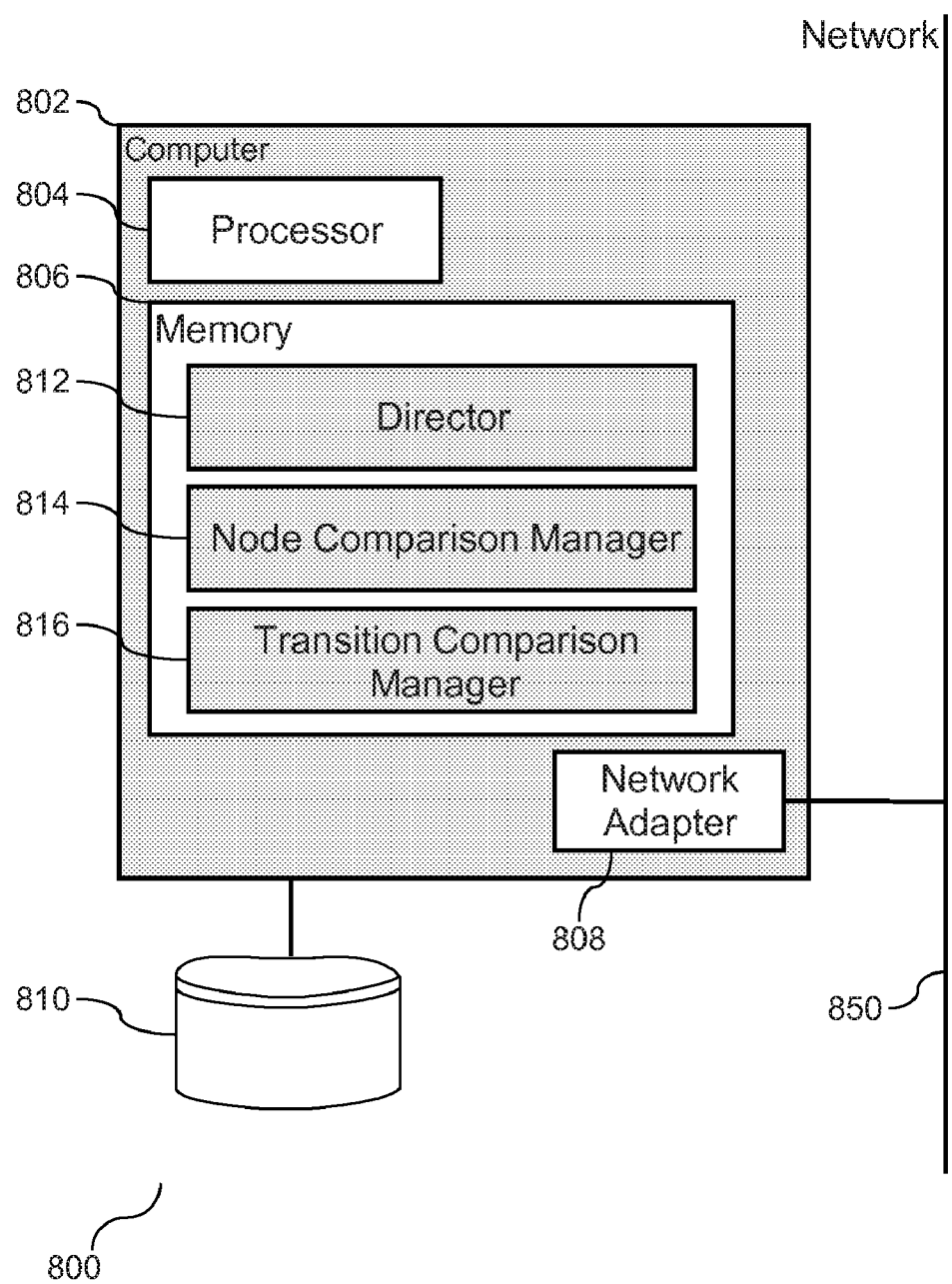
FIG. 8 is a block diagram of a computer system with a tool for evaluation of modifications of a hierarchical state diagram.

In one embodiment, a director, a state comparison manager, and a transition comparison manager are provided in software or hardware. With respect to the software implementation, the director and managers may include, but are not limited to, firmware, resident software, microcode, etc. The software implementation can take the form of a computer program product accessible from a computer-useable or computer-readable medium providing program code for use by or in connection with a computer or any instruction execution system. FIG. 8 is a block diagram (800) illustrating placement of the director and managers in a computer system. The illustration shows a computing device (802) with a processor (804) and memory (806). As shown, the computing device (802) may communicate across a network (850) through a network adapter (808). The state hierarchical diagram is stored in storage media (810) in communication with the computing device (802). In one embodiment, the storage media (810) may be remote data storage (not shown) that is accessible through communications across the network (850). A director (812), a node comparison manager (814), and a transition comparison manager (816) are shown residing in memory (806) of the computer device (802). The director (812) may implement instructions to convert the hierarchical state diagram to a tree structure and to store this format of the diagram in local or remote storage. The node comparison manager (814) may implement instructions to navigate the diagram and to compare a node of a modified version of the diagram with a corresponding node of an earlier version of the diagram. Similarly, the transition comparison manager (816) may implement instructions to navigate the diagram and to compare a transition of a modified version of the diagram with a corresponding transition of an earlier version of the diagram. Both the node manager (814) and the transition manager (816) count all modifications to the compared nodes and/or transitions of the diagrams and report the associated counts to the director (812). The director (812) quantifies the node and transition modifications, and forwards the quantified modifications to a visual display to be viewed. Accordingly, the modifications to the hierarchical state diagram counts all of the individual modifications to the states and transitions, quantifies the modifications, and displays them on a visual display in a quantifiable manner to facilitate viewing of the modifications to the diagram.

For the purposes of this description, a computer-useable or computer-readable medium can be any apparatus that can contain, store, communicate the program for use by or in connection with the instruction execution system, apparatus, or device.

As shown, network adapters may also be coupled to the system to enable the data processing system to become coupled to other data processing systems or remote printers or storage devices through intervening private or public networks. Modems, wireless and Ethernet adapters are just a few of the currently available types of network adapters.

Advantages Over the Prior Art

A method and system are provided for effectively displaying modifications to states and transitions in a hierarchical state diagram. Information of a modification on a child level in the tree structure is transferred to the parent level. In the case where the model on the parent level is displayed, the modification information is quantified and displayed. This enables the contents and extent of the modification to be understood by viewing the model on the parent level, and removes the necessity to move to and from the respective levels to determine modifications. Similarly, the modification point and modification degree are visually expressed in a manner that removes the tedious requirement for code review to determine modifications made.

Alternative Embodiments

It will be appreciated that, although specific embodiments of the invention have been described herein for purposes of illustration, various modifications may be made without departing from the spirit and scope of the invention. In particular, the process of comparing states and transitions includes comparing any two hierarchical state diagrams and should not be limited to comparing a modified version with an original version. Similarly, although it is disclosed that all of the modifications are to be reflected in the parent node of the tree structure, the modification may be reflected in any node at any level in the hierarchy. Accordingly, the scope of protection of this invention is limited only by the following claims and their equivalents.

We claim:

1. A method for visualizing a state transition hierarchical diagram comprising:

expressing, by a processor, said diagram in a tree structure with a parent level representing an initial state of an object and a child level representing a secondary state of the object, the secondary state selected from the group consisting of: a transition state and a final state, with each level in the hierarchy having a state represented as a node, and a transition represented as a line between two nodes, said tree structure stored in memory in communication with the processor;

comparing, by the processor, each node of a modified version of said diagram with a corresponding node of an earlier version of said diagram;

counting, by the processor, all modifications to said compared nodes of said diagrams;

comparing, by the processor, each transition of said modified version of said diagram with a corresponding transition of said earlier version of said diagram;

counting, by the processor, all modifications to said compared transitions of said diagrams;

quantifying, by the processor, said counted modifications and transferring each quantified modification in each child node at the child level to a parent node at the parent level; and displaying said quantified modifications on the parent level.

2. The method of claim 1, wherein the step of counting all modifications to said compared nodes of said diagrams includes accounting for a generation level in said hierarchy where said modification is identified.

3. The method of claim 2, wherein the step of counting all modifications to said compared transitions of said diagrams includes accounting for said generation level in said hierarchy where said modification is identified.

4. The method of claim 3, further comprising transferring said counted modifications to a parent level of said tree structure.

5. The method of claim 4, further comprising displaying the modifications of the tree structure on a visual display with color indications with different colors assigned to defined thresholds of a quantity of modifications to said nodes and transitions of said diagram.

6. A computer system comprising:
   a processor in communication with storage media and a visual display;
   a hierarchical state diagram, stored in computer readable format in said storage media, to represent behavior of an object, said diagram having at least two states at different hierarchical levels and at least one transition between said states;
   a director to express said diagram in a tree structure with a parent level representing an initial state of an object and at least one child level representing a secondary state of the object, the secondary state selected from the group consisting of: a transition state and a final state, with each level in the hierarchy having a state represented as a node and a transition represented as a line between two nodes;
   a node comparison manager to compare each node of a modified state diagram with a corresponding node of an earlier version of said diagram;
   said node comparison manager to count all modifications to said compared nodes of said diagrams and to report said node count to said director;
   a transition comparison manager to compare a each transition of a modified state diagram with a corresponding transition of an earlier version of said diagram;
   said transition manager to count all modifications to said compared transitions of said diagrams and to report said transition count to said director;
   said director to quantify said node and transition modifications, and to transfer each of said quantified modifications from each child node to a parent node; and
   a visual display to illustrate said quantified modifications on the parent level.

7. The system of claim 6, wherein said node comparison manager accounts for a generation level in said hierarchy where said modification is identified.

8. The system of claim 7, wherein said transition comparison manager accounts for said generation level in said hierarchy where said modification is identified.

9. The system of claim 8, further comprising said director to transfer said counted modifications to a parent level of said tree structure.

10. The system of claim 9, further comprising indicia in the form of color enhancements to be applied to a graphical representation of said tree structure on said visual display.

11. The system of claim 10, wherein said color enhancements include different colors assigned to defined thresholds of a quantity of modifications to said nodes and said transition in said diagram.

12. An article of manufacture comprising:
    a computer readable memory having computer-readable instructions stored thereon executable by a processor, comprising:
      instructions to express a hierarchical state diagram in a tree structure with a parent level representing an initial state of an object and at least one child level representing a secondary state of the object, the secondary state selected from the group consisting of: a transition state and a final state, with each level in the hierarchy having a state represented as a node and a transition represented as a line between two nodes;
      instructions to compare each node of a modified version of said diagram with a corresponding node of an earlier version of said diagram;
      instructions to count all modifications to said compared nodes of said diagram;
      instructions to compare each transition of said modified version of said diagram with a corresponding transition of an earlier version of said diagram;
      instructions to count all modifications to said compared transitions of said diagram;
      instructions to quantify said counted modifications and to transfer each of said quantified modifications from each child node on the child level to a parent node on the parent level; and
      instructions to display said quantified modifications on the parent level.

13. The article of claim 12, wherein the instructions to count all modifications to said compared nodes of said diagram includes instructions to account for a generation level in said hierarchy where said modification is identified.

14. The article of claim 13, wherein the instructions to count all modification to said compared transitions of said diagram includes instructions to account for said generation level in said hierarchy where said modification is identified.

15. The article of claim 14, further comprising instruction to transfer said counted modifications to a parent level of said tree structure.

16. The article of claim 15, further comprising instructions to apply indicia in the form of color enhancements to a graphical representation of said tree structure on said visual display.

17. The system of claim 16, wherein said color enhancements include different colors assigned to defined thresholds of a quantity of modifications to said nodes and said transition in said diagram.

* * * * *